April 9, 1940.  R. F. DOW  2,196,255
SLACK TAKE-UP DEVICE
Filed May 7, 1938  2 Sheets-Sheet 1
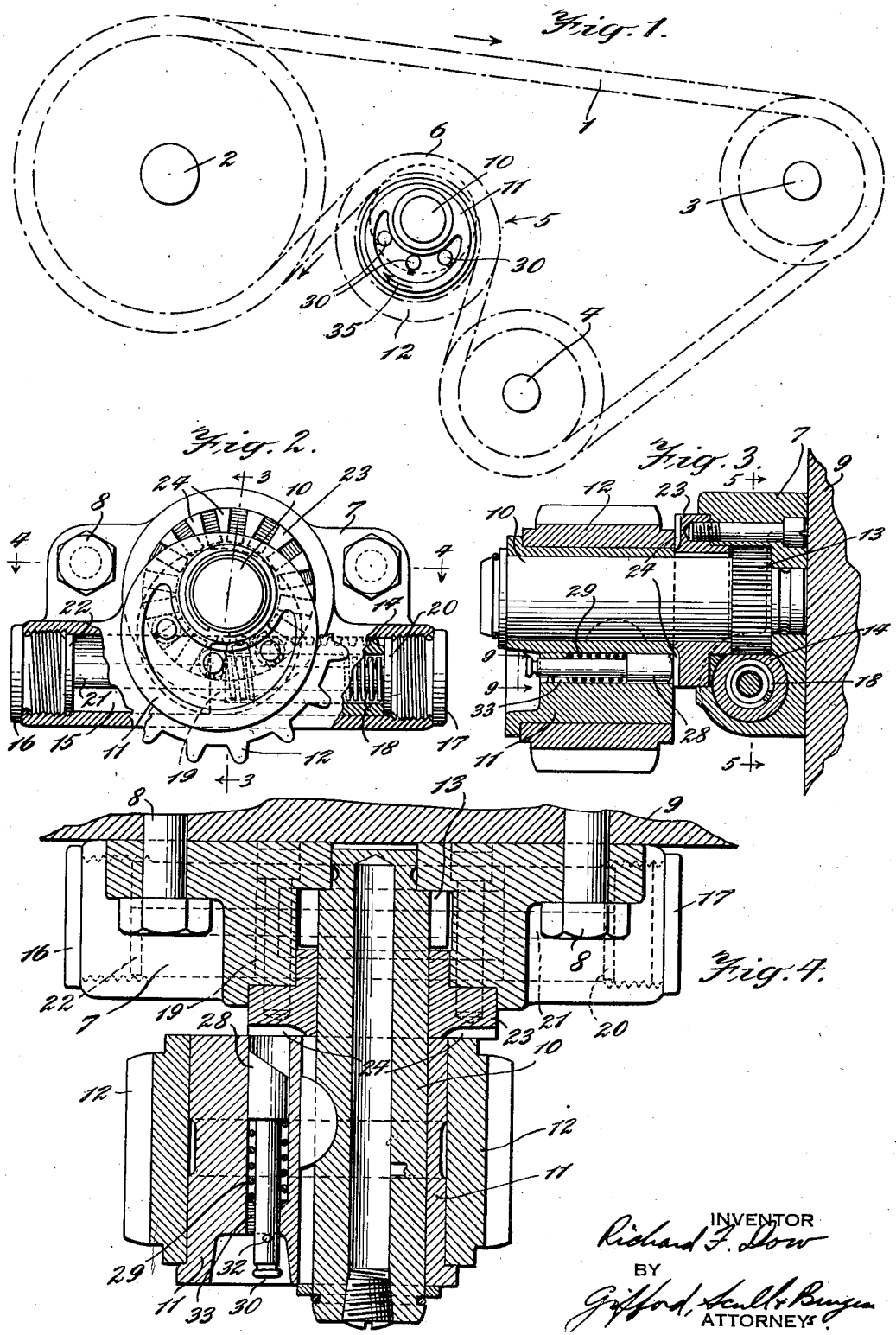
INVENTOR
Richard F. Dow
BY
ATTORNEYS April 9, 1940.  R. F. DOW  2,196,255
SLACK TAKE-UP DEVICE
Filed May 7, 1938   2 Sheets-Sheet 2
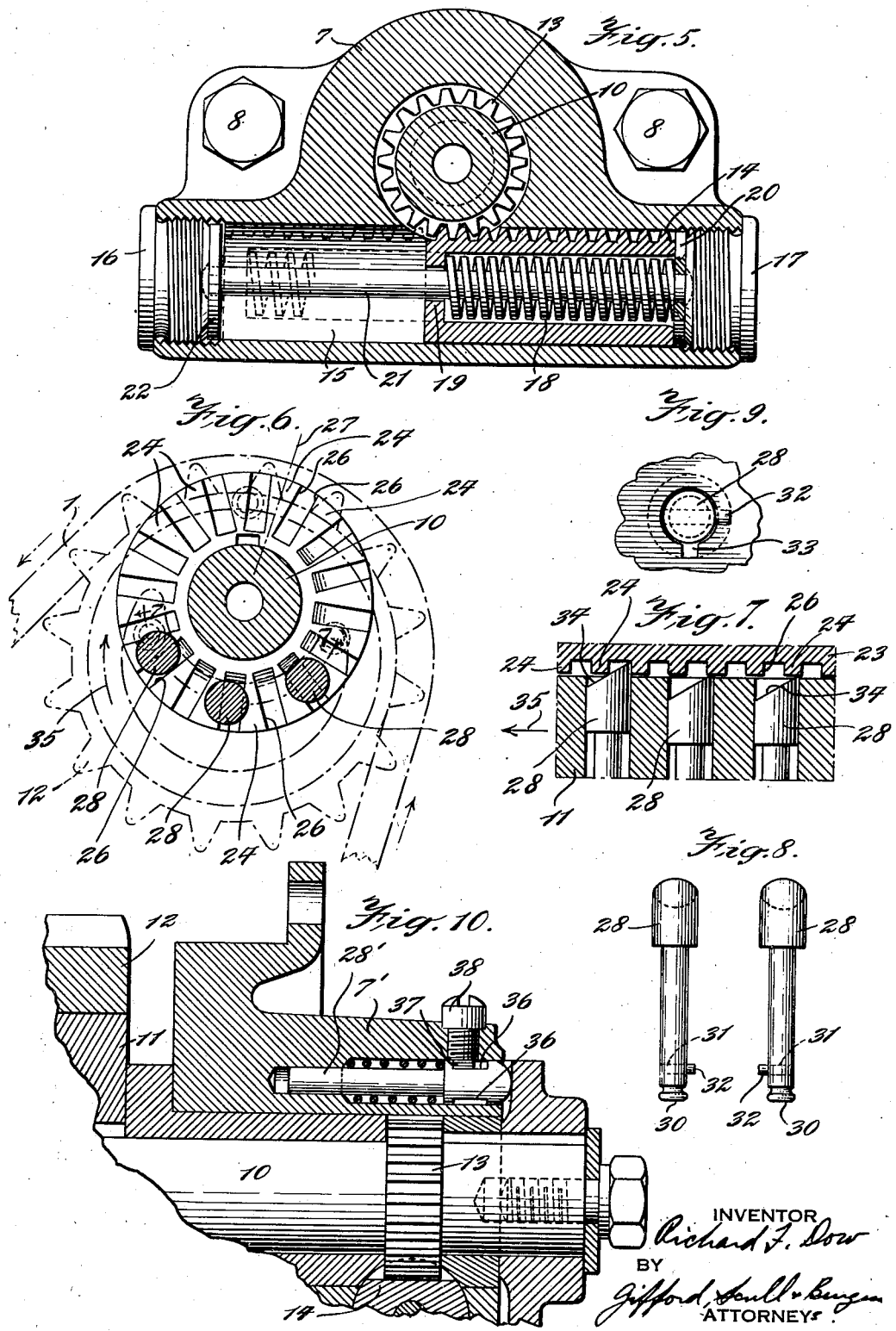

Patented Apr. 9, 1940

2,196,255

UNITED STATES PATENT OFFICE 2,196,255

SLACK TAKE-UP DEVICE

Richard F. Dow, Hartford, Conn., assignor to The Whitney Chain & Mfg. Company, Hartford, Conn., a corporation of Connecticut Application May 7, 1938, Serial No. 206,560

16 Claims. (Cl. 74—242.11)

This invention relates to a novel and improved form of slack take-up device of the general kind described and claimed in my prior Patents 1,-913,872, granted June 13, 1933, and 2,002,081, granted May 21, 1935. The novel features will be best understood from the following description and the annexed drawings, in which I have shown a selected embodiment of the invention and in which:

Fig. 1 is a diagrammatic view of a chain drive having my invention employed therewith;

Fig. 2 is a view on an enlarged scale showing the take-up device, this view being partly in elevation and partly in section, and certain of the parts being broken away;

Fig. 3 is a view substantially on the line 3—3 of Fig. 2;

Fig. 4 is a view approximately on the line 4—4 of Fig. 2, but showing the bearing in a different position;

Fig. 5 is a section approximately on the line 5—5 of Fig. 3;

Fig. 6 is a face view of the ratchet disk showing the relation of the pawls to the teeth of the disk;

Fig. 7 is a view taken approximately on the line 7—7 of Fig. 6;

Fig. 8 shows two views of one of the pawls, illustrating how they may be changed to operate either right-hand or left-hand;

Fig. 9 is a fragmentary view approximately on the line 9—9 of Fig. 3 but showing the pawl in inoperative position;

Fig. 10 is a fragmentary view taken on a plane corresponding to that of Fig. 3 but illustrating a slightly different construction.

The invention finds particular utility in connection with automatically taking up of slack in chain drives, such as are used, for example, in the operation of timing mechanism on automobiles. For the sake of simplicity, I shall hereinafter refer to the device as used with a sprocket and a chain, although by so doing I do not intend to limit myself to the use of the invention with a chain drive to the exclusion of a belt or other drive where the invention may be found useful.

In Fig. 1, I have shown diagrammatically a chain drive including a chain 1 engaging sprockets on three shafts 2, 3, and 4. The take-up device is indicated generally at 5 where it is arranged in a bight or loop 6 of the chain. The device is arranged to take up the slack which occurs in the chain from wear or any other cause.

As shown, the invention comprises a body 7 which may be secured by screws or bolts 8 to a stationary part 9 of the engine or other machine with which the device is used. Rotatably mounted in the body is a pinion shaft 10 to which is keyed or otherwise fixed a bearing 11 of cylindrical form upon which is rotatably mounted an idler sprocket 12. As plainly shown, the bearing and sprocket are eccentric to the axis of the shaft 10.

Fixed to the shaft 10 is a pinion 13 which meshes with a rack 14 slidably mounted in a chamber 15 in the body 7. This chamber may be in the form of a cylindrical bore closed at both ends by means of threaded plugs 16 and 17. In the embodiment illustrated herein, the rack is forced towards the left by means of a compression spring 18 mounted within the rack and bearing against an end wall 19 thereof and also against an abutment 20 secured to one end of a rod 21 which passes through the rack and the spring. The opposite end of the rod 21 may be supplied with a stop 22 to prevent disengagement of the rack when the compression on the spring is released.

Secured to the body 7 is a ratchet disk 23 having on its face a plurality of teeth 24. These teeth define recesses between them, and the opposite sides 26, formed by the sides of the teeth, of any one recess are parallel to each other instead of being radial. However, the center line 27 of any one tooth is preferably disposed radially with respect to the axis of the shaft 10. The teeth 24 cooperate with pawls 28 which may be of the general form shown in my aforesaid prior patents. These pawls are slidably mounted in the bearing as indicated in Fig. 3 and are urged towards the ratchet disk 23 by compression springs 29. The outer end of the pawl is formed as indicated at 30, for use in pulling the pawl outwardly against the action of the spring 29, and adjacent the outer end each pawl is preferably provided with a transverse bore 31 to receive a temporary locking pin 32. Each pin 32 rides in a groove 33 so as to hold the pawl in exact position for engagement with the teeth 24, it being seen that each pawl has a tapered end as indicated at 34 so that it may ride freely over the teeth 24 in one direction.

When a pawl is pulled outwardly or towards the left in Fig. 3, it may then be turned so that the pin 32 will occupy some such position as shown in Fig. 9, where it engages the outer surface of the bearing so that the pawl is temporarily held in inoperative position. As shown, the pawls will prevent rotation of the bearing in one direction while permitting it in the other. If it is desired to reverse the arrangement so that the pawls will permit movement in the opposite direction, then all that is necessary is to remove the pawls and push the pins 32 through the pawls 31. In Fig. 8 I have shown the pin 32 in the two positions necessary for "right-hand" and "left-hand" operation, it being understood, of course, that the pin 32 engaging in the groove 33 will hold the pawl in correct position for either one of these two operations.

In order to avoid the necessity of a fine toothed ratchet, I preferably arrange the three pawls as indicated. Referring particularly to Figs. 6 and 7, it will be seen that the left-hand pawl is in engagement with a tooth of the ratchet disk, and that the right-hand pawl is out of operative engagement with any tooth to a substantial degree, whereas the middle pawl is out of operative engagement with any tooth to a degree about half that of the right-hand pawl. That is, the spacing of the pawls is greater than the spacing of the ratchet teeth, and is not a multiple thereof. Therefore, assuming that the bearing rotates in the direction of the arrow 35 in Fig. 6, the left-hand pawl 28 will move out of operative engagement with the tooth with which it is shown in engagement in Fig. 6, but shortly the middle pawl will drop into operative engagement with a tooth and then shortly thereafter it will be cammed out of that engagement and the right-hand pawl will drop into operative engagement with a tooth.

In operation, the parts are assembled, as best shown in Figs. 2, 5, and 6, with the spring 18 under compression, which is here shown as its maximum compression. The parts may be held in that condition by any suitable temporary means, and then the device is applied to the chain as shown in Fig. 1. The spring will tend to move the rack 19 towards the left as viewed in Figs. 2 and 5 and this in turn will tend to rotate the shaft 10 and bearing 11 in a clockwise direction, as indicated by the arrow 35 in Figs. 1 and 6. Thus the action of the spring will tend to maintain a suitable tension on the bight of the chain engaging the idler sprocket 12 rotatably mounted on the bearing.

As slack develops in the chain for any reason, the spring will automatically take up that slack by rotation of the shaft 10 and the bearing 11, because of the eccentricity of the bearing to the shaft. Backward movement of the bearing in a counterclockwise direction is prevented by the pawls 28, only a very slight backward movement being permitted before one of the pawls will engage one of the teeth 24, as best shown in Figs. 6 and 7. While this movement is, of course, also resisted by the spring, the pawls furnish a positive means for preventing backward movement, for example under the influence of a back-firing of the engine with which the chain drive may be used. By the arrangement shown, using a plurality of pawls, only one of which is operatively engaged with a ratchet tooth at one time, it is possible to employ a more rugged construction, as will be seen.

By the above arrangement it will be seen that I have provided an automatic take-up device which has certain advantages over those of the prior art. For instance, the spiral groove and pin arrangement shown in the prior art, for example in my own prior patents, has certain disadvantages in the way of expense and taking up space which are avoided by my present invention.

The initial position of the bearing may be adjusted by movement of the rack lengthwise of the chamber in which it is disposed. This adjustment may be as fine as one tooth of the pinion or rack, as it will be seen that by removing the plugs 16 and 17 the rack may be removed and the pinion turned to any desired position. Although when the rack is inserted in its chamber a certain amount of rotation of the pinion may result, nevertheless this can be easily allowed for. Likewise it will be seen that either the full compression of the spring may be used or the spring may be only partly compressed, no matter what may be the initial position of the bearing.

In Fig. 10 I have shown a different form of pawl to achieve the same function as provided by the movable pins 32. In this form the pawl is provided with oppositely disposed flat faces 36 each adapted to be engaged by a guide 37 which may be formed on the end of a screw 38 threaded into the body 7', and thus hold the pawl in "right-hand" or "left-hand" position, as desired. In this form, the pawl 28' is not exposed at its outward end but otherwise functions in substantially the same way as previously described. In Fig. 10 similar parts have been given the same numerals as before and their function will not be further described here.

While I have shown the invention as embodied in a specific form, it is to be understood that various changes in details may be made without departing from the scope of the invention, as defined by the appended claims.

I claim:

1. In a slack take-up device comprising an idler and a bearing on which said idler is rotatably mounted, a rotatably mounted shaft disposed eccentrically of said bearing and fixed thereto, a pinion on said shaft, a rack engaging said pinion, and means constantly urging said rack in one direction, thereby to rotate said shaft and said bearing.

2. In a slack take-up device comprising an idler and a bearing on which said idler is rotatably mounted, a rotatably mounted shaft disposed eccentrically of said bearing and fixed thereto, a pinion on said shaft, a rack engaging said pinion, and a spring urging said rack in one direction, thereby to rotate said shaft and said bearing.

3. In a slack take-up device comprising an idler and a bearing on which said idler is rotatably mounted, a rotatably mounted shaft disposed eccentrically of said bearing and fixed thereto, a pinion on said shaft, a rack engaging said pinion, and means constantly urging said rack in one direction, thereby to rotate said shaft and said bearing, said means being reversible, to urge said rack in the opposite direction.

4. In a slack take-up device comprising an idler and a bearing on which said idler is rotatably mounted, a rotatably mounted shaft disposed eccentrically of said bearing and fixed thereto, a pinion on said shaft, a unit comprising a rack engaging said pinion and a spring acting on said rack to rotate said shaft and said bearing in one direction, said unit being reversible to rotate said shaft and bearing in the opposite direction, and means to support said unit in either one of its reversed positions.

5. In a slack take-up device comprising an idler and a bearing on which said idler is rotatably mounted, a rotatably mounted shaft disposed eccentrically of said bearing and fixed thereto, a pinion on said shaft, a unit comprising a rack engaging said pinion and a spring acting on said rack to rotate said shaft and said bearing in one direction, said unit being reversible to rotate said shaft and bearing in the opposite direction, means to support said unit in either one of its reversed positions, a reversible pawl, and a ratchet adapted to cooperate with said pawl in either one of said directions of movement, to prevent return movement of said bearing.

6. In a slack take-up device comprising an idler and a bearing on which said idler is rotatably mounted, a rotatably mounted shaft disposed eccentrically of said bearing and fixed thereto, a pinion on said shaft, a rack engaging said pinion, a spring urging said rack in one direction, thereby to rotate said shaft and said bearing, and a chamber in which said rack and spring are disposed, said chamber being constructed and arranged to support said rack and spring in either one of two reversed positions, to rotate said shaft in opposite directions.

7. In a slack take-up device comprising an idler and a bearing on which said idler is rotatably mounted, a rotatably mounted shaft disposed eccentrically of said bearing and fixed thereto, a pinion on said shaft, a rack engaging said pinion, a rod extending lengthwise through said rack and having an abutment at one end thereof, and a compression spring surrounding said rod and acting between said abutment and said rack, for the purpose set forth.

8. In a slack take-up device comprising an idler and a bearing on which said idler is rotatably mounted, means supporting said bearing to rotate about an axis eccentric to the bearing, means constantly urging said bearing to rotate in one direction and reversible to urge it to rotate in the opposite direction, a fixed ratchet disk concentric with said shaft and having a plurality of teeth facing said bearing, the adjoining edges of two adjacent teeth being parallel to each other, and a reversible pawl on said bearing adapted to cooperate with either one of said edges.

9. In a slack take-up device comprising an idler and a bearing on which said idler is rotatably mounted, means supporting said bearing to rotate about an axis eccentric to the bearing, means constantly urging said bearing to rotate in one direction and reversible to urge it to rotate in the opposite direction, a fixed ratchet, a pawl slidably mounted in said bearing to move towards and away from said ratchet, means yieldingly urging said pawl towards said ratchet, and means normally preventing rotation of said pawl in said bearing and holding said pawl in one of two opposite positions wherein it cooperates with said ratchet.

10. In a slack take-up device comprising an idler and a bearing on which said idler is rotatably mounted, means supporting said bearing to rotate about an axis eccentric to the bearing, means constantly urging said bearing to rotate in one direction, a fixed ratchet, a plurality of pawls slidably mounted in said bearing, and means yieldingly urging said pawls toward said ratchet, means for manually withdrawing said pawls from contact with said ratchet, means for retaining said pawls in withdrawn position, the spacing of said pawls being different from that of the teeth of the ratchet or a multiple thereof, whereby only one pawl at a time will operate to prevent backward movement of said bearing.

11. In a slack take-up device comprising an idler and a bearing on which said idler is rotatably mounted, a rotatably mounted shaft disposed eccentrically of said bearing and fixed thereto, a pinion on said shaft, a unit comprising a rack engaging said pinion and a spring, means to hold said unit in either one of two positions, either in a position wherein its spring acts on said rack to rotate said shaft in one direction, or in a position wherein its spring acts on said rack to rotate said shaft in the opposite direction.

12. In a slack take-up device comprising an idler and a bearing on which said idler is rotatably mounted, means supporting said bearing to rotate about an axis eccentric to the bearing, means constantly urging said bearing to rotate in one direction, a fixed ratchet plate having teeth on one face thereof separated by recesses with parallel walls, a pawl pin, means slidably supporting said pin in said bearing in position to cooperate with said teeth, and means to hold said pin in either one of two positions, in one of which positions it may engage the wall on one side of a recess to prevent movement of the bearing in one direction and in the other of which positions it may engage the wall on the other side of said recess to prevent movement of the bearing in the opposite direction.

13. In a slack take-up device, a rotatably mounted shaft, an idler surrounding said shaft, a cylindrical bearing between said shaft and idler and fixed to said shaft to rotate therewith, said bearing rotatably supporting said idler and being concentric with said idler and eccentric to said shaft, a spring, an operative connection between said spring and shaft and actuated by said spring to rotate said shaft and bearing, and means to support said spring and said first-named means in either one of two positions, either in a position wherein said spring and first named means will rotate said shaft in one direction or in a position wherein said spring and first named means will rotate said shaft in the opposite direction.

14. In a slack take-up device, a rotatably mounted shaft, an idler surrounding said shaft, a cylindrical bearing between said shaft and idler and fixed to said shaft to rotate therewith, said bearing rotatably supporting said idler and being concentric with said idler and eccentric to said shaft, a spring, an operative connection between said spring and shaft and actuated by said spring to rotate said shaft and bearing, means to support said spring and said first-named means in either one of two position, either in a position wherein said spring and first named means will rotate said shaft in one direction or in a position wherein said spring and first named means will rotate said shaft in the opposite direction, a reversible pawl on said bearing, and a ratchet adapted to cooperate with said pawl in either one of said directions of rotation, to prevent return rotation of said bearing.

15. In a slack take-up device, a rotatably mounted shaft, an idler surrounding said shaft, a cylindrical bearing between said shaft and idler and fixed to said shaft to rotate therewith, said bearing rotatably supporting said idler and being concentric with said idler and eccentric to said shaft, a unit comprising means adapted to constantly tend to rotate said shaft in one direction, and means to support said unit in either one of two positions, either in a position wherein said first named means will tend to rotate said shaft in one direction or in a position wherein it will tend to rotate said shaft in the opposite direction.

16. In a slack take-up device, a rotatably mounted shaft, an idler surrounding said shaft, a cylindrical bearing between said shaft and idler and fixed to said shaft to rotate therewith, said bearing rotatably supporting said idler and being concentric with said idler and eccentric to said shaft, a unit comprising means adapted to constantly tend to rotate said shaft in one direction, means to support said unit in either one of two positions, either in a position wherein said first named means will tend to rotate said shaft in one direction, or in a position wherein it will tend to rotate said shaft in the opposite direction, a reversible pawl on said bearing, and a ratchet adapted to cooperate with said pawl in either one of said directions of rotation, to prevent return rotation of said bearing.

RICHARD F. DOW.